May 26, 1953  I. W. ALCORN  2,639,611

DEAD WEIGHT TANK FOR TESTING THE BEARING VALUE OF A COLUMN

Filed Dec. 7, 1948

*INVENTOR.*
*IRWIN W. ALCORN*
BY
*Edward H. Lang*
ATTORNEY

Patented May 26, 1953

2,639,611

UNITED STATES PATENT OFFICE 2,639,611

DEAD WEIGHT TANK FOR TESTING THE BEARING VALUE OF A COLUMN

Irwin Wyland Alcorn, Houston, Tex., assignor to The Pure Oil Company, Chicago, Ill., a corporation of Ohio Application December 7, 1948, Serial No. 63,982

4 Claims. (Cl. 73—84)

This invention relates to an apparatus for testing the bearing value of columns and, in particular, consists of a dead weight load-applying apparatus for a column.

In underwater oil well drilling operations, it is necessary to erect a working platform over the point where the well is to be drilled so that a derrick can be erected and various operations performed in place. Before a safe working platform can be fabricated, the foundation therefor must be set in place and usually it will take the form of a pier built on piles. The piles may be of various lengths, but will normally be long enough to be driven into the bed underlying the body of water and leave a section projecting above the surface. Sound procedure calls for testing the bearing value of a pile after it is driven in order to see that it is capable of carrying its share of the load. Frequently, in drilling operations, the load for a single pile will be as high as 250,000 pounds. The difficulty of bringing so much dead weight, or a mechanical apparatus capable of applying such a load to a pile, to a point over a body of water is apparent.

Accordingly, it is a fundamental object of my invention to provide a dead weight column or pile testing apparatus which weighs only a small fraction of the load which is to be applied to a pile.

It is a second object of the invention to provide a very simple mechanical structure which can be used for testing the bearing value of columns and obviate the necessity of providing heavy mechanical apparatus for the purpose.

It is a further object of the invention to provide a simple dead weight testing apparatus in the form of a tank whereby the load applied to a column under test may be varied between substantially zero and the maximum load for which the column is to be tested.

Other objects and advantages of the invention will in part be obvious and in part appear hereinafter.

The invention, accordingly, is embodied in an apparatus which comprises essentially a tank having a longitudinal sleeve so that the tank can be slipped on to a pile to be tested, and when it is in place, be filled with water to the extent desired to apply the necessary load to the pile.

A full understanding of the invention and of its application in testing piles may be gained from the examination of the following specification and the accompanying drawing in which.

Figure 2:
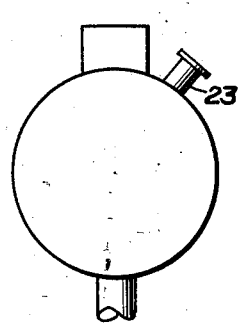
Figures 2, 3 and 4 represent in diagrammatic style several other forms of apparatus.
Figure 1:
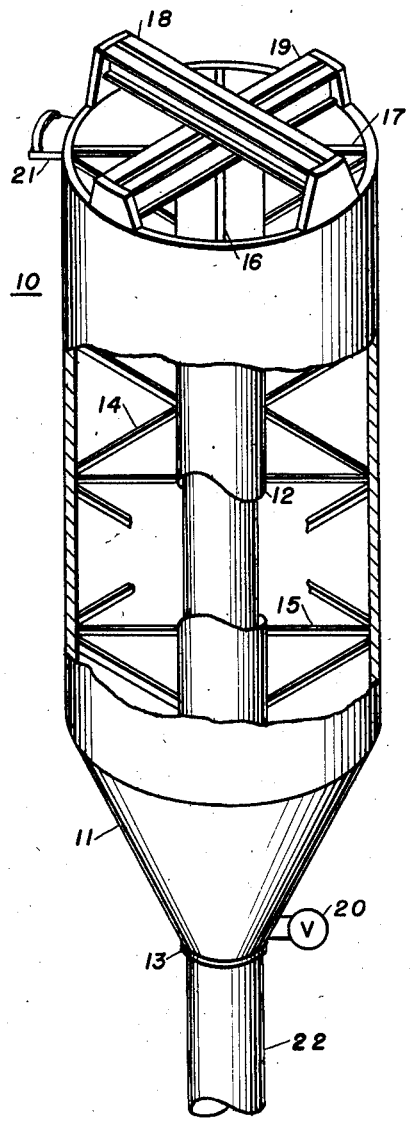
Figure 1 represents a perspective view of the apparatus in place on a pile and taken partly in section in order to show the interior structure thereof.

In the drawing, 10 represents a large cylindrical sheel having a conical bottom 11 and a centrally disposed longitudinal sleeve 12 passing the length thereof. Sleeve 12 is integrally joined with the conical bottom at 13 and is supported along its length within the shell by braces like 14, 15, 16 and 17. Across the upper end of the tank, which may be wholly open, there is mounted at least a pair of transverse supports in the form of I-beams 18 and 19 which are arranged with their ends fastened to the outer shell 10 and cross over the open end of sleeve 12. A quick opening discharge valve 20 is provided near the bottom of the tank so that it can be drained easily of any water contained therein. Similarly, for convenience, a conduit support in the form of a bracket or clamp 21 is provided at the top of the tank to permit the attachment of a hose thereto through which water can be pumped into the tank. Because of the greater ease in filling the apparatus with a load-imparting fluid the preferred embodiment of the instant invention is, as shown in Figure 1, an open-topped vessel. In the event that a totally enclosed vessel, such as the spherical configuration shown in Figure 2, is employed to contain the load-imparting fluid an inlet means must be provided in the upper region of the vessel to admit the fluid into the container section of the vessel. As an example, a nozzle 23 or plurality of nozzles which may or may not be fitted with adjustable closure means may be utilized for this purpose.

From the diagram and the description given, the manner of using the structure can readily be determined, because it is shown in place on a pile 22 and the use of the various structural sections can be determined therefrom. Cross pieces 18 and 19 at the top of the tank make possible its support by those elements. Braces, such as 14, 15, 16 and 17 serve to hold the tank and the pile sleeve in good longitudinal alignment during its use. Bracket 21, to which a hose or conduit of any type can be clamped supports the conduit so that the tank is readily pumped full of water once it has been slipped on to a pile. When the test has been completed by filling the tank to a certain point and observing the behavior of the pile, the tank is readily emptied by the opening of the quick action discharge valve 20. When it is emptied, it is conveniently lifted off the pile and moved on to the next one for the test.

In testing of columns, it is essential that the load be applied as symmetrically as possible in order to obtain a true estimate of the bearing value thereof. That is, the bearing strength of the pile can be considered as being concentrated at its longitudinal axis. Any test load should be applied so that the center of gravity of the load will be aligned essentially with the longitudinal axis of the column. Should the load be asymmetrically applied, a false indication of the bearing value of the pile might be obtained because one side of the pile will be under compression and the other under tension. With the use of proper adapters, where the sleeve 12 does not fit neatly around a given pile, load can be symmetrically applied to a pile by means of this tank in controlled amount from loads which approximate only the weight of the tank up to loads which equal the weight of the tank when it is full of water. The advantage of being able to conduct a test under such conditions, where a controlled load is applied in substantially continuous gradation is obvious.

Figure 3:
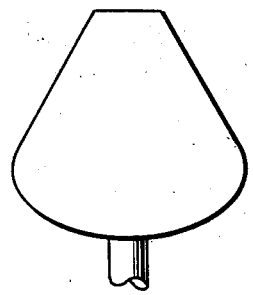
Figure 4:
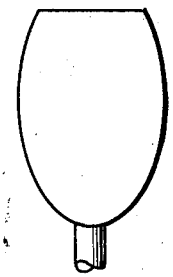

Thus, I have described a new type of column testing device for use in testing piles on the site where they are being driven and, in particular, on the site where they are being driven in relatively deep water. Although the invention has been described in terms of only a specific single embodiment, variations thereof, particularly, in the shape of the tank as shown in Figures 2, 3 and 4 can readily be made. The principal feature upon the fabrication of a tank, is to select a shape which permits the alignment of the center of gravity of the load with the axis of the column to be tested and, in general, a configuration symmetrical about a longitudinal axis is indicated. Thus, spherical, combination conical and ellipsoidal, and ellipsoidal forms as shown in Figures 2, 3 and 4 are useful, for they can be made as symmetrical tanks defined by surfaces of revolution about a longitudinal axis. In these structures, the center of gravity of the tank will be placed in line with the longitudinal axis of the column being tested. A refinement of the design is to locate the center of gravity below the middle of the vessel. I have found that the essentially symmetrical arrangement illustrated in Figure 1 of the drawing is convenient, both in ease of fabrication and placement of the load.

Thus, though the invention has been described in detail with respect to only a single specific embodiment, the spirit and scope thereof should be apparent and the drawings should be taken as illustrative and not restrictive thereof.

What is claimed is:

1. An apparatus for testing the bearing value of a column comprising, a vessel, the surface of said vessel being a surface of revolution symmetrical with respect to its vertical axis, a substantially vertical longitudinally supported sleeve disposed coaxially with said axis and adapted to engage slidably with the column, the length of said sleeve being substantially equal to the length of said vessel, means for admitting a fluid into said vessel and means adjacent the upper extremity of said sleeve for supporting said vessel symmetrically on the terminal section of the column.

2. A testing apparatus comprising, a vessel symmetrical about its vertical axis, a sleeve member of substantially smaller cross section than said vessel extending substantially the entire distance between the vertically spaced extremities of said vessel and aligned with the axis of symmetry of said vessel, said sleeve member being adapted to engage slidably a column, and means adjacent the upper extremities of said sleeve for supporting the apparatus longitudinally upon the terminal section of a substantially vertical column to apply a load thereto.

3. A vessel comprising, an outer shell, a longitudinal inner sleeve of substantially the same length as said shell and having a lesser cross section than the shell disposed coaxially within said shell thereby forming an annular space closed at one end, means to hold the shell and sleeve in fixed spaced relationship and a discharge valve in the closed end of said vessel, said vessel being provided with a means for coaxially supporting the vessel upon a substantially vertical column.

4. A test loading apparatus for determining the bearing capacity of driven piling comprising an elongated vessel having affixed therein a sleeve extending the vertical longitudinal length of said vessel along the axis thereof and penetrating the bottom of said vessel thereby forming an annulus between said sleeve and vessel, said sleeve being held in fixed relation with said vessel by means of suitable bracing, means for filling said vessel with liquid and a valved outlet adjacent the bottom of the said vessel, and a means contiguous to the upper end of said sleeve adapted to support said apparatus upon the terminal end of a substantially vertical driven pile when said apparatus is slidably engaged thereon.

IRWIN WYLAND ALCORN.

References Cited in the file of this patent

UNITED STATES PATENTS

| Number | Name | Date |
|---|---|---|
| 818,643 | Schock | Apr. 24, 1906 |
| 1,947,515 | Blackburn | Feb. 20, 1934 |
| 2,130,751 | Van Der Meer | Sept. 20, 1938 |

FOREIGN PATENTS

| Number | Country | Date |
|---|---|---|
| 140,524 | Germany | Apr. 18, 1903 |
| 60,544 | Denmark | Jan. 24, 1943 |